(12) United States Patent
Lacko et al.

(10) Patent No.: US 12,299,028 B2
(45) Date of Patent: May 13, 2025

(54) SYSTEMS AND METHODS FOR IDENTIFYING A DESIGN TEMPLATE MATCHING A SEARCH QUERY

(71) Applicant: Canva Pty Ltd, Surry Hills (AU)

(72) Inventors: Jarrah Lacko, Surry Hills (AU); Danny Wu, Sydney (AU); William Radford, Sydney (AU); Jin Yu, Surry Hills (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 18/600,121

(22) Filed: Mar. 8, 2024

(65) Prior Publication Data
US 2024/0311422 A1 Sep. 19, 2024

(30) Foreign Application Priority Data

Mar. 16, 2023 (AU) ................................ 2023201648

(51) Int. Cl.
G06F 18/20 (2023.01)
G06F 16/2457 (2019.01)
G06F 16/532 (2019.01)

(52) U.S. Cl.
CPC ...... G06F 16/532 (2019.01); G06F 16/24578 (2019.01)

(58) Field of Classification Search
None
See application file for complete search history.

(56) References Cited

U.S. PATENT DOCUMENTS

| 2019/0205962 | A1* | 7/2019 | Piramuthu | .......... | G06F 16/9035 |
| 2021/0233140 | A1* | 7/2021 | Aggarwal | ................ | G06F 16/50 |
| 2021/0365727 | A1 | 11/2021 | Aggarwal et al. | | |

FOREIGN PATENT DOCUMENTS

WO 2020257862 A1 12/2020

OTHER PUBLICATIONS

Bashir, M. F., et al., "Subjective Answers Evaluation Using Machine Learning and Natural Language Processing", in IEEE Access, vol. 9, pp. 158972-158983, 2021.
Examination Report No. 2 for Australian Patent Application No. 2023201648 mailed Apr. 10, 2024, pp. 1-5.
Ladani, D. J., et al., "Automatic stopword Identification Technique for Gujarati text", 2021 International Conference on Artificial Intelligence and Machine Vision (AIMV), Gandhinagar, India, 2021, pp. 1-5.
Ramesh, A., et al., "Zero-Shot Text-to-Image Generation", Proceedings of the 38th International Conference on Machine Learning, PMLR 139:8821-8831, 2021, pp. 1-11.
Examination Report No. 1 for Australian application No. 2023201648 mailed May 25, 2023, pp. 1-5.

* cited by examiner

Primary Examiner — Jau Shya Meng
(74) Attorney, Agent, or Firm — GrowIP Law Group LLC

(57) ABSTRACT

Method and system for identifying design templates that match an input query are disclosed. The method includes: receiving a design search query; performing a template search based on the design search query, the template search returning a first template design, the first template design including a target image; processing the design search query to generate an image search query; performing an image search based on the image search query, the image search returning a candidate image; and generating a new design. The new design is based on the first template design and includes the candidate image instead of the target image.

18 Claims, 8 Drawing Sheets

SYSTEMS AND METHODS FOR IDENTIFYING A DESIGN TEMPLATE MATCHING A SEARCH QUERY

CROSS-REFERENCE TO RELATED APPLICATION

This application is a U.S. Non-Provisional Application that claims priority to Australian Patent Application No. 2023201648, filed Mar. 16, 2023, which is hereby incorporated by reference in its entirety.

TECHNICAL FIELD

Aspects of the present disclosure are directed to digital design software applications and more particularly to systems and methods for identifying design templates matching an input search query.

BACKGROUND

Various computer applications for creating and publishing digital designs exist. Generally speaking, such applications allow users to create a design by, for example, creating one or more pages and adding design elements, such as text, images, audios, videos, etc., to that page.

Often such applications provide a number of design templates in various design categories to aid users in creating designs. Design templates generally have one or more non-customizable elements such as background art, theme colors, etc., that cannot be customized and one or more customizable components-such as text, images, placement of the text or images. Users can select a design template from the available templates and customize it to create their own design, by e.g., customizing or changing one or more of the customizable elements available in the design template.

However, when a plethora of design templates are available, it may often be difficult for a user to select a particular design template from the almost unlimited choice.

SUMMARY

Described herein is a computer-implemented method. The method includes receiving a design search query, and performing a template search based on the design search query. The template search returns a first design template that includes a target image. The method further includes processing the design search query to generate an image search query and performing an image search based on the image search query. The image search returns a candidate image. The method further includes generating a new design. The new design is based on the first design template and it includes the candidate image instead of the target image.

Also described herein is a computer-implemented method for identifying one or more design templates matching a design search query. The method includes receiving the design search query provided by a user and performing a template search based on the design search query. The template search returns a set of design templates. Each of the set of design templates includes a target image. The method further includes processing the design search query to generate an image search query, and performing an image search based on the image search query. The image search returns a set of candidate images. The method further includes generating a set of design templates, the set of design templates including one or more new design templates. The one or more new design templates are based on one or more design templates from the set of design templates and include one or more candidate images from the set of candidate images instead of their corresponding target images.

Further described herein is a computer processing system including a processing unit, and a non-transitory machine readable medium storing instructions, which when executed by the processing unit, cause the processing unit to perform the computer-implemented methods described above.

Further still described herein is a non-transitory machine readable medium storing instructions executable by a processing unit to cause the processing unit to perform the methods described above.

Figure 1:
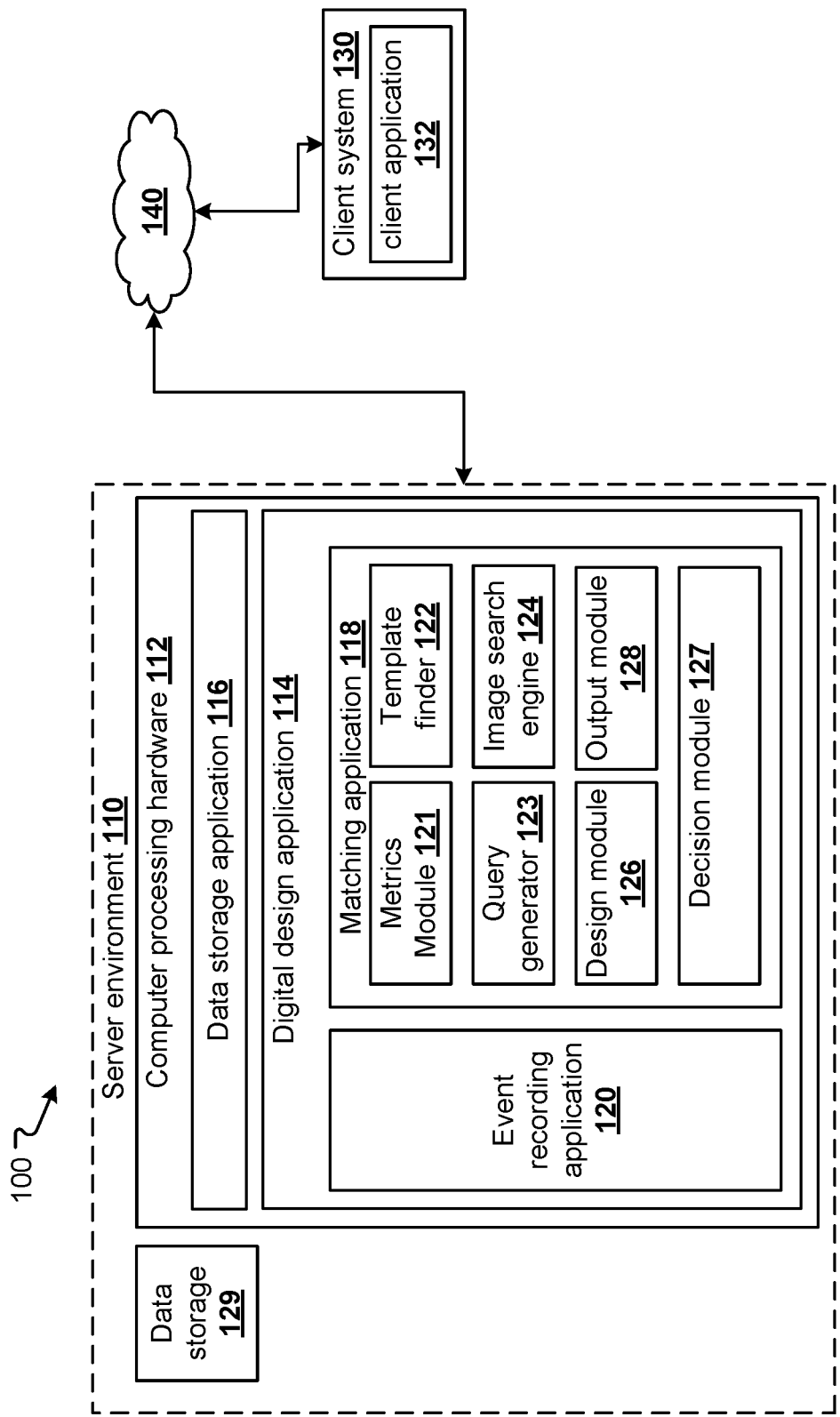
FIG. 1 is a diagram depicting a networked environment in which various features of the present disclosure may be implemented.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover modifications, equivalents, and alternatives falling within the scope of the present invention as defined by the appended claims.

DETAILED DESCRIPTION

In the following description, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Generally speaking, aspects of the present disclosure are utilized in systems and methods for creating digital designs. In particular, the techniques disclosed herein are described in the context of a computer system that is configured to facilitate the creation of digital designs. By way of example, and generally speaking, the computer system may provide user interfaces that allow a user to create and edit a digital design by adding, deleting, or modifying elements (such as graphics and/or text) in a design template.

As described previously, most digital design computer applications present a plethora of design templates to users in various design categories. The templates may be organized based on one or more design parameters such as design type, theme, colors, occasion, etc. A user may browse these design templates (often by filtering/sorting/searching based on one or more design parameters) until a particular design template is selected for customization.

In case a computer application offers hundreds of thousands of templates, users may find the task of identifying a suitable design template based on conventional search techniques to be challenging. If the digital design application has an advanced search engine, users may be able to enter keywords or even natural language search queries and the digital design application may be able to retrieve design templates that match the user search query and provide these to the user. For example, a user may input a query such as "$40^{th}$ birthday party" and the design application may be able to retrieve design templates for $40^{th}$ birthday party invitation cards or save the date cards.

However, in some cases, the design templates managed by the design application may not completely match the user query. For example, a user may input a query such as "Lost parrot reward poster." The design application may have many lost puppy or lost cat poster templates, but may not have any lost parrot poster templates. In such cases, if the search rules of the design application require all keywords to be found, the design application may return an error message indicating that the design application does not have any design templates matching the user query and may request the user to retry or if the search rules require any of the keywords to be found, the design application may retrieve and display the lost puppy or lost cat posters. However, neither of these satisfies the users' original search query and may result in a non-satisfactory user experience.

To aid with one or more of the above-identified issues, aspects of the present disclosure provide systems, methods, and/or computer readable media that are configured to provide more accurate design template results for input search queries than previously known systems. In addition, the presently disclosed systems and methods may be configured to automatically and in real time update existing design templates to create new design templates that more accurately match a search query.

To this end, the presently disclosed systems and methods may receive a design search query from a user and perform a search for candidate design templates based on the design search query. The systems and methods may also process the design search query to create keywords for an image query. In particular, the systems and methods may ignore non-visual tokens/words in the design search query to create an image search query that includes one or more tokens/words from the design search query that can be visually represented. A check may then be performed to see if the candidate design templates include the keywords generated for the image search query. If the candidate design templates include the keywords generated for the image query, the identified candidate design templates may be displayed to the user. Alternatively, if one or more of the candidate design templates do not include one or more of the keywords generated for the image query, the one or more keywords may be used to perform an image search, e.g., in a repository of images. The disclosed systems and methods may then update the one or more candidate design templates with one or more images identified in the image search.

This way, if templates that accurately match a search query are found, they are returned to the user without any further processing. But, if a threshold number of candidate design templates are not found that accurately match the search query, further processing may be performed to identify one or more candidate images that more accurately match the input query and to update one or more of the candidate design templates with the identified one or more candidate images to present more accurate design templates to a user.

Therefore, the presently disclosed systems and methods may provide a selection of accurate candidate design templates to a user to choose from based on a design search query provided by the user. The systems and methods can intelligently and automatically identify and update candidate design templates by augmenting an initial template search with an image search if required. Further, a user may be able to quickly preview new candidate design templates (with more accurate images) that more accurately match the input search query—this may further aid the user in selecting the ultimate design template they wish to use and customize.

For example, consider the user input query "LOST PARROT POSTER." The system may determine keywords for an image query based on this input query to be "PARROT." The system may also perform a template search based on the text input query and identify n candidate design templates. However, these design templates may partially match the input query—e.g., they may be poster templates for lost dogs or cats and may not include the word parrot in the template descriptions and/or metadata. Based on this, the system may perform a search for images of parrots in an image repository. The search may result in one or more images of parrots. The system may then filter these images based on one or more conditions and replace images of dogs or cats in the n candidate design templates with the one or more parrot images to create new design templates with images of parrots.

These and other aspects of the present disclosure will now be described with reference to the following figures.

FIG. 1 is a diagram depicting a networked environment in which various features of the present disclosure may be implemented.

Embodiments of the present disclosure are described with reference to a digital design platform 100 which includes server- and client-side applications which operate together to perform the processing described herein.

The digital design platform 100 includes a server environment 110 and a client system 130 which communicate via one or more communications networks 140 (e.g. the Internet).

Generally speaking, the server environment 110 includes computer processing hardware 112 (discussed below) on which applications that provide server-side functionality to client applications such as client application 132 (described below) execute. In the present case, the server environment 110 includes a digital design application 114 (which may also be referred to as a front end server applications), and a data storage application 116.

The digital design application 114 may execute to provide a client application endpoint that is accessible over the communications network 140. For example, where the digital design application 114 serves web browser client applications the digital design application 114 is hosted by a web server, which receives and responds to HTTP requests. Where the digital design application 114 serves native client applications, the digital design application 114 is hosted by an application server configured to receive, process, and respond to specifically defined API calls received from those client applications. The server environment 110 may include one or more web server applications and/or one or more application server applications allowing it to interact with both web and native client applications.

Generally speaking, the digital design application 114 facilitates various functions related to creating and editing designs in the digital design platform 100. This may include, e.g., creating, editing, storing, searching, retrieving, and/or viewing designs. The digital design application 114 may also facilitate additional functions that are typical of server systems-such as user account creation and management, user authentication, and/or other server side functions. These functionalities may be provided by individual applications, e.g., an account management application (not shown) for account creation and management, a design creation application (not shown) to aid users in creating, editing, storing designs, a management application (not shown) that is configured to maintain and store design templates and media items (such as images, videos and/or audio files) in the data storage, etc.

In addition to these applications, the digital design application 114 include a matching application 118. The matching application 118 may be configured to receive a design search query from a client system 130 that includes a text query and may be configured to serve one or more candidate design templates that match the text query to the client system 130. In some embodiments, the matching application 118 may also be configured to replace a target image in one or more candidate design template(s) with one or more images found in an image search. In order to do so, the matching application 118 includes sub-modules or programs. These include-a metrics module 121, a template finder 122, a query generator 123, an image search engine 124, a design module 126, a decision module 127, and an output module 128. The metrics module 121 is configured retrieve event data from the event recording application 120 and maintain usage metrics. The template finder 122 is configured to perform a text-based search in a repository of design templates to identify one or more candidate design templates that match a given input query. The query generator 123 is configured to receive the input text query and convert it into a query for an image search. The image search engine 124 is configured to receive the image search query from the query generator 123 and perform a search in a repository of images to identify one or more candidate images that match the image search query. The design module 126 is configured to receive the one or more of the candidate design templates from the template finder 122 and one or more candidate images from the image search engine 124 and replace an image in the received candidate design templates with one or more of the candidate images to generate new design templates. The image of the candidate design template that is replaced is referred to as a target image in this disclosure). The decision module 127 is configured to instruct the image search engine 124 to perform an image search and instruct the design module 126 to generate one or more new design templates. It does so based on one or more conditions. The output module 128 is configured to receive a final set of unchanged or new design templates and communicate the final set of design templates to a client application 132. Operations of these modules 121-128 will be described in more detail later.

The event recording application 120 monitors user account interactions with the digital design application 114 and records these user account interactions as event logs or event records. The event recording application 120 may be configured to communicate the event records to the matching application 118 and in particular, the metrics module 121 either as a continuous stream or in batches periodically.

In some cases, the event recording application 120 may be an independent event that is designed based on a publish-subscribe model. That is, the client applications 132 and/or the digital design application 114 send event data to the event platform and consumers (such as the metrics module 121) subscribe to the event platform to receive certain type of event data from the event platform. In this model, the publishers categorize the event data into classes without knowledge of which subscribers there may be. Similarly, subscribers express interest in one or more classes of event data and receive event data from the event platform that is of interest to them. When the event platform receives an event record, the event platform matches the event log with the subscribers who are subscribed to the event and makes a copy of the event data for the subscribers and stores a copy of the subscriber's queue or stream. In this case, the client applications 132 and/or digital design application 114 may submit event records to the event platform and the metrics module 121 may subscribe to the event platform to receive event data related to any user account interaction with design templates hosted by the server environment 110.

The data storage application 116 executes to receive and process requests to persistently store and retrieve data relevant to the operations performed/services provided by the digital design application 114. Such requests may be received from the digital design application 114 and/or (in some instances) directly from client applications such as 132. Data relevant to the operations performed/services provided by the digital design application 114 may include, e.g., user account data, user design data (i.e., data describing designs that have been created by users), design template data (e.g., templates that can be used by users to create designs), image data (e.g. data in respect of stock images that users may add to designs), and/or other data relevant to the operation of the server environment 110. In addition, the data may include usage metrics (e.g., data indicating how often a design template is selected and/or how often an image is replaced in a design template).

The data storage application 116 may be a relational database management application or an alternative application for storing and retrieving data from data storage 129. Data storage 129 may be any appropriate data storage device (or set of devices), for instance one or more non-transitory computer readable storage devices such as hard disks, solid state drives, tape drives, or alternative computer readable storage devices.

In server environment 110, the digital design application 114 persistently stores data to data storage device 129 via the data storage application 116. In alternative implementations, however, the digital design application 114 may be configured to directly interact with data storage devices such as 129 to store and retrieve data (in which case a separate data storage application 116 may not be needed). Furthermore, while a single data storage application 116 is described, server environment 110 may include multiple data storage applications. For instance, one data storage application 116 may be used for user account data, another for user design data, another for design element data, another for image descriptions and so forth. In this case, each data storage application 116 may interface with one or more shared data storage devices and/or one or more dedicated data storage devices, and each data storage application may receive/respond to requests from various server-side and/or client-side applications (including, digital design application 114).

As noted, the digital design application 114 runs on (or are executed by) computer processing hardware 112. Computer processing hardware 112 includes one or more computer processing systems. The precise number and nature of those systems depends on the architecture of the server environment 110.

For example, in one implementation each digital design application 114 may run on its own dedicated computer processing system. In another implementation, two or more digital design applications 114 may run on a common/shared computer processing system. In a further implementation, server environment 110 is a scalable environment in which application instances (and the computer processing hardware 112—i.e. the specific computer processing systems required to run those instances) are commissioned and decommissioned according to demand—e.g., in a public or private cloud-type system. In this case, server environment 110 may simultaneously run multiple instances of each application (on one or multiple computer processing systems) as required by client demand. Where server environment 110 is a scalable system, it includes additional applications to those illustrated and described. As one example, the server environment 110 may include a load balancing application (not shown) which operates to determine demand, direct client traffic to the appropriate design application instance 114 (where multiple design applications 114 have been commissioned), trigger the commissioning of additional server environment applications (and/or computer processing systems to run those applications) if required to meet the current demand, and/or trigger the decommissioning of server environment applications (and computer processing systems) if they are not functioning correctly and/or are not required for current demand.

Communication between the applications and computer processing systems of the server environment 110 may be by any appropriate means, for instance direct communication or networked communication over one or more local area networks, wide area networks, and/or public networks (with a secure logical overlay, such as a VPN, if required).

The present disclosure describes various operations that are performed by applications of the server environment 110. Generally speaking, however, operations described as being performed by a particular application (e.g., matching application 118) could be performed by one or more alternative applications, and/or operations described as being performed by multiple separate applications (e.g., design creation application and management application) could in some instances be performed by a single application.

Client system 130 hosts a client application 132 which, when executed by the client system 130, configures the client system 130 to provide client-side functionality/interact with server environment 110 (or, more specifically, the digital design application 114). Via the client application 132, and as discussed in detail below, a user can access the various techniques described herein—e.g., the user can input search queries, view and preview design templates, edit, or publish one or more candidate design templates, etc. Client application 132 may also provide a user with access to additional design related operations, such as creating, editing, saving, publishing, sharing, and/or other design related operations.

The client application 132 may be a general web browser application which accesses the digital design application 114 via an appropriate uniform resource locator (URL) and communicates with the digital design application 114 via general world-wide-web protocols (e.g. HTTP, HTTPS, FTP). Alternatively, the client application 132 may be a native application programmed to communicate with digital design application 114 using defined application programming interface (API) calls and responses.

A given client system such as 130 may have more than one client application 132 installed and executing thereon. For example, a client system 130 may have a (or multiple) general web browser application(s) and a native client application.

The present disclosure describes some method steps and/or processing as being performed by the client application 132. In certain embodiments, the functionality described may be natively provided by the client application 132 (e.g. the client application 132 itself has instructions and data which, when executed, cause the client application 132 to perform the described steps or functions). In alternative embodiments, the functionality described herein may be provided by a separate software module (such as an add-on or plug-in) that operates in conjunction with the client application 132 to expand the functionality thereof.

In still further alternative embodiments, the functionality describe herein may be provided by a separate application which communicates with the client application 132 as required—for example to receive data required to perform the processing and communicate the output generated by the processing. The separate application may run on client system 130 or on an alternative computer processing system. As one example, the separate application may be an image processing application or an alternative application running at server environment 110 or at an alternative server environment.

While the embodiments described below make use of a client-server architecture, the techniques and processing described herein could be adapted to be executed in a stand-alone context—e.g. by an application (or set of applications) that run on a computer processing system and can perform required functionality without need of a server environment or application.

As noted, the techniques and operations described herein are performed by one or more computer processing systems.

By way of example, client system 130 may be any computer processing system which is configured (or configurable) by hardware and/or software—e.g. client application 132—to offer client-side functionality. A client system 130 may be a desktop computer, laptop computer, tablet computing device, mobile/smart phone, or other appropriate computer processing system.

Similarly, the applications of server environment 110 are also executed by one or more computer processing systems. Server environment computer processing systems are typically server systems, though again may be any appropriate computer processing systems.

Figure 2:
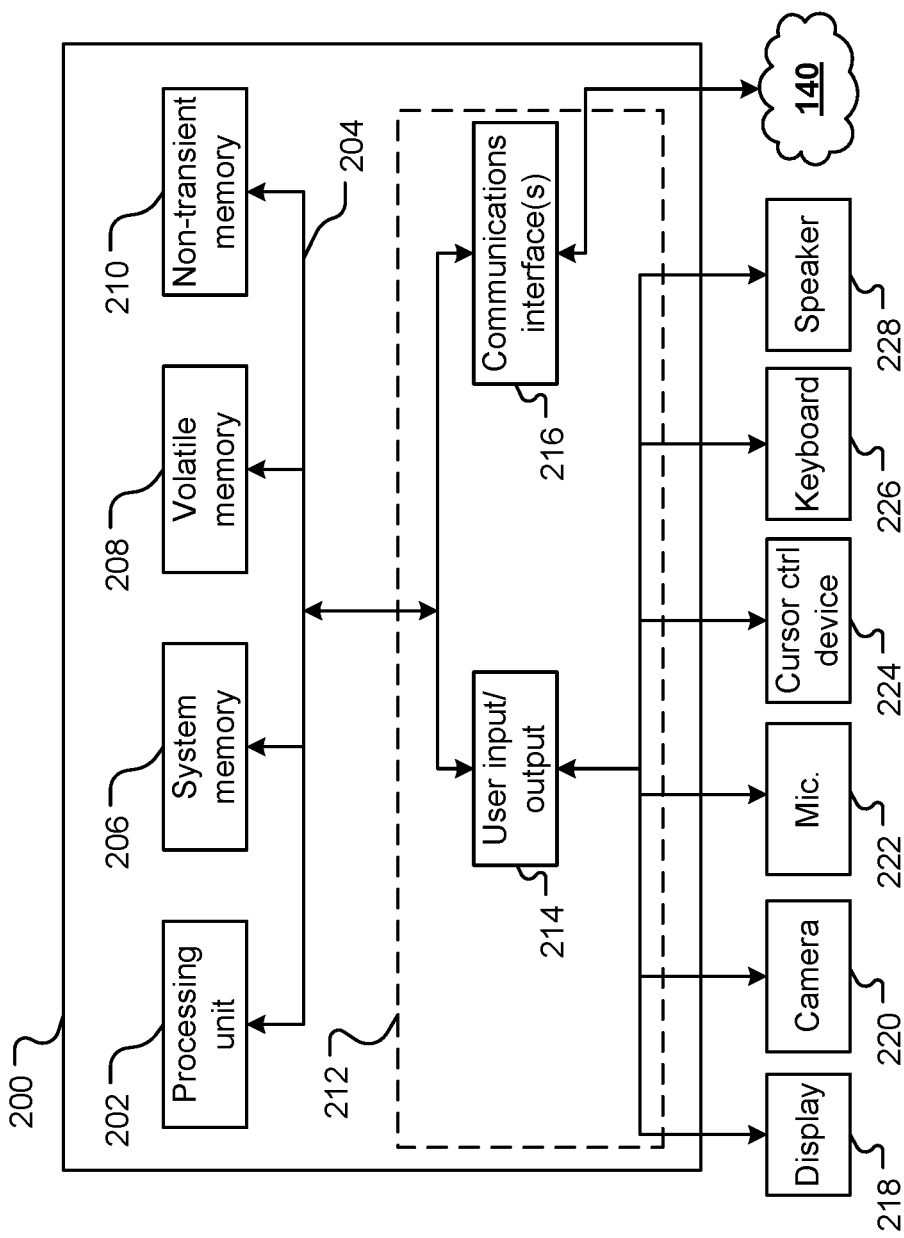
FIG. 2 is a block diagram of a computer processing system configurable to perform various features of the present disclosure.

FIG. 2 provides a block diagram of a computer processing system 200 configurable to implement embodiments and/or features described herein. System 200 is a general-purpose computer processing system. It will be appreciated that FIG. 2 does not illustrate all functional or physical components of a computer processing system. For example, no power supply or power supply interface has been depicted, however system 200 either carries a power supply or is configured for connection to a power supply (or both). It will also be appreciated that the particular type of computer processing system determines the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function, the processing required to perform that operation or function may be performed by processing unit 202. In other instances, processing required to perform that operation or function may also be performed by remote processing devices accessible to and useable (either in a shared or dedicated manner) by system 200.

Through a communications bus 204 the processing unit 202 is in data communication with a one or more machine-readable storage (memory) devices, which store computer readable instructions and/or data, which are executed by the processing unit 202 to control operation of the processing system 200. In this example system 200 includes a system memory 206 (e.g. a BIOS), volatile memory 208 (e.g. random access memory such as one or more DRAM modules), and non-transitory memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Generally speaking, and depending on the particular system in question, devices to which system 200 connects—whether by wired or wireless means-include one or more input devices to allow data to be input into/received by system 200 and one or more output device to allow data to be output by system 200. Example devices are described below, however it will be appreciated that not all computer-processing systems include all mentioned devices, and that additional and alternative devices to those mentioned may well be used.

For example, system 200 may include or connect to one or more input devices by which information/data is input into (received by) system 200. Such input devices may include keyboard, mouse, trackpad, microphone, accelerometer, proximity sensor, GPS, and/or other input devices. System 200 may also include or connect to one or more output devices controlled by system 200 to output information. Such output devices may include devices such as a display (e.g. a LCD, LED, touch screen, or other display device), speaker, vibration module, LEDs/other lights, and/or other output devices. System 200 may also include or connect to devices which may act as both input and output devices, for example memory devices (hard drives, solid state drives, disk drives, and/or other memory devices) which system 200 can read data from and/or write data to, and touch screen displays which can both display (output) data and receive touch signals (input).

By way of example, where system 200 is a client system such as 130 it may include a display 218 (which may be a touch screen display), a camera device 220, a microphone device 222 (which may be integrated with the camera device), a cursor control device 224 (e.g. a mouse, trackpad, or other cursor control device), a keyboard 226, and a speaker device 228.

System 200 also includes one or more communications interfaces 216 for communication with a network, such as network 140 of digital design platform 100 (and/or a local network within the server environment 110). Via the communications interface(s) 216, system 200 can communicate data to and receive data from networked systems and/or devices.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transitory machine-readable medium such as 210 accessible to system 200. Instructions and data may be transmitted to/received by system 200 via a data signal in a transmission channel enabled (for example) by a wired or wireless network connection over an interface such as communications interface 216.

Typically, one application accessible to system 200 is an operating system application. In addition, system 200 stores or has access to applications which, when executed by the processing unit 202, configure system 200 to perform various computer-implemented processing operations described herein. For example, and referring to the networked environment of FIG. 1 above, server environment 110 includes one or more systems which run a digital design application 114, and a data storage application 116. Similarly, client system 130 runs a client application 132.

In some cases, part or all of a given computer-implemented method is performed by system 200 itself, while in other cases processing may be performed by other devices in data communication with system 200.

The following section describes data structures employed by the digital design application 114 to identify design templates suitable for an input query. The data structures and fields described are provided by way of example. Depending on the implementation, additional, fewer, or alternative fields may be used. Further, the fields described in respect of a given data structure may be stored in one or more alternative data structures (e.g. across multiple linked data structures). Further, although tables are used to illustrate the data structures, the relevant fields/information may be stored in any appropriate format/structure.

Data in respect of design templates and new designs that are being created may be stored in various formats. An example design data format that is used throughout this disclosure will now be described. Alternative design data formats (storing alternative design attributes) are, however, possible, and the processing described herein can be adapted for alternative formats.

In the present context, data in respect of a given design template is stored in a design record. Generally speaking, a design record defines certain design-level attributes and includes page data. The page data includes (or references) one or more page records, each of which defines a page of the design. A design's page data defines (or references) one or more page records. Each page record defines a page of the design via one or more page-level attributes and element data.

In the present example, the format of a design record is a device independent format including a set of key-value pairs (e.g. a map or dictionary). To assist with understanding, a partial example of a design record format is as follows:

TABLE A

Example design record

| Key/field | Value |
| --- | --- |
| Design ID | "designId": "abc123", |
| Dimensions | "dimensions": {"width": 1080, "height": 1080}, |
| Design type | "type": ["poster"], |
| Design name | "name": "lost puppy", |
| Design owner | "owner": 12ab34cd, |
| Edit time | "edited": "xxx" |
| Pages | "pages": [{page 1}, . . . {page n}] |

In this example, the design-level attributes include: a design identifier (which uniquely identifies the design); page dimensions (e.g., a default page width and height); a design type (e.g., an indicator of the type of the design, which may be used for searching and/or sorting purposes); a design name (e.g., a string defining a default or user specified name for the design); a design owner (e.g., an identifier of a user or group that owns or created the design); a most recent edit time (e.g., a timestamp indicating when the design was last edited); and page data (discussed below). Additional and/or alternative design-level attributes may be provided, such as attributes regarding creation date, design version, design permissions, and/or other design-level attributes such as design metadata.

To assist with understanding, a partial example of a page record format is as follows:

TABLE B

Example page record

| Attribute | Value |
| --- | --- |
| Page ID | Page 1 |
| Dimensions | "dimensions": {"width": 1080, "height": 1080} |
| Background | "background": {"ImageID": "M12345"} |
| Element data | "elements": [{element 1}, . . . {element n}] |

In this example, the page-level attributes include: a page identifier (which uniquely identifies the page number in a given design), dimensions (e.g. a page width and height which, if present, override the default page dimensions defined by the design level dimensions attribute described above); background (data indicating any page background that has been set, for example an image identifier of an image that has been set as the page background, a value indicating a particular color of a solid background fill, or data indicating an alternative background); and element data (discussed below). Additional and/or alternative page-level attributes may be provided, such as attributes regarding creation date, design version, design permissions, and/or other design-level attributes.

In this example, a design page's element data is a set (in this example an array) of element records. The element record defines an element (or a set of grouped elements) that has been added to the page. In this example, an element record's position in a page's elements array serves to identify the element and also determines the depth or z-index of the element (or element group) on the page (e.g. an element at array index n is positioned above an element at array index n−1 and below an element at array index n+1). Element depth may be alternatively handled, however, for example, by storing depth as an explicit element attribute.

Generally speaking, an element record defines an object that has been added to a page—e.g. by copying and pasting, importing from one or more asset libraries (e.g. libraries of images, animations, videos, etc.), drawing/creating using one or more design tools (e.g. a text tool, a line tool, a rectangle tool, an ellipse tool, a curve tool, a freehand tool, and/or other design tools), or by otherwise being added to a design page.

Different types of design elements may be provided for depending on the system in question. By way of example, design element types such as the following may be provided: image/graphic elements; video elements; audio elements; text elements; and/or elements of other types.

As will be appreciated, different attributes may be relevant to different element types. For example, any element that holds visual media (e.g. an image, video, text, etc) is typically associated with position and size data, while such data may not be relevant to an element that holds audio media. Accordingly, different element record formats (with different attributes) may be used for different element types.

By way of example, an element record for image element may be as follows:

TABLE C

Example element record

| Attribute | Note | E.g. |
| --- | --- | --- |
| Type | A value defining the type of the element. | "type": "IMAGE" |
| Position | Data defining the position of the element: e.g. an (x, y) coordinate pair defining (for example) the top left point of the element. | "position": (100, 100) |
| Size | Data defining the size of the element: e.g. a (width, height) pair. | "size": (500, 400) |
| Rotation | Data defining any rotation of the element. | "rotation": 0 |
| Opacity | Data defining any opacity of the element (or element group). | "opacity": 1 |
| Media item identifier | Data indicating the media item (e.g. an image) that the element holds/is used to display | "MediaItemID": "M12345" |

The matching application 118 may further maintain an image repository. The image repository may include records of images maintained by the design application. The image record may include an image name, an image description, an image size, an image resolution, an image aspect ratio, image keywords, etc.

By way of example, an image record may be as follows:

TABLE D

Example image record

| Field | Value |
|---|---|
| Identifier | "ImageID": "M12345" |
| Name | Parrot237.mpeg |
| Size | 500, 400 |
| Description | An image of a multicolored parrot in a tree |
| Resolution | 1392 × 1024 |
| Aspect ratio | 3:2 |
| keywords | Parrot tree multicolor cockatoo green |

In addition to design template records, page records, element records, and image records, the matching application 118 may also maintain and store usage metric data with respect to usage of the design templates and or images/graphics. For example, it may maintain data with respect to the number of times an image has been used in a design, the number of times a design template has been selected, etc.

It will be appreciated that a number of implicit conclusions can be drawn from event data. For example, if an image is selected rarely in a design, it can be conclude that the image is either unpopular with customers or is not sufficiently visible to customers (e.g., because it appears towards the end of any search for images). Similarly, if a particular design template is selected very often, it can be concluded that the design template is liked by customers.

Accordingly, usage metrics are maintained so that the usage of images/graphics and/or design templates can be analyzed. The usage metric data may also be utilized in the present disclosure to help determine whether a target image in a design template should be replaced by another image or not.

Table E illustrates example image usage data. This data indicates popularity of images. Each record may include an image ID and a corresponding count of the number of times customers have clicked on the image, used the image in a design template, and/or the number of times the image is the image is displayed to users along with a timestamp of the last time the image was used in a design template.

TABLE E

Design template usage metrics

| Image identifier | Click count | Publish count | Impression count | Timestamp (last event) |
|---|---|---|---|---|
| 2352 | 30 | 10 | 237 | 13/02/2023 18:13PM |
| 2353 | 23 | 12 | 431 | 13/02/2023 16:43PM |
| 7364 | 51 | 3 | 467 | 11/02/2023 10:23AM |
| 8236 | 97 | 32 | 876 | 6/02/2023 7:55 AM |
| ... | ... | ... | ... | ... |

In some examples, table E may store records if the timestamp is before a threshold/cutoff date (e.g., less than 6 months old). If any record in the table is older than the threshold date, it may be deleted from the database. This way table D maintain up to date or current usage data.

In addition to the above, in some embodiments, the design application 114 may also maintain and store training data for training the query generator 123. For instance, the training data may include a plurality of input text queries and corresponding desired output image search queries. This data may be provided to the query generator 123 in order to train the query generator 123 to output an image search query based on an input text query.

Table F illustrates an example portion of the training data that may be stored. As seen in this example, the training data includes text input that is fed to the query generator and the text output expected from the query generator.

TABLE F

Example training data for query generator

Figure 3:
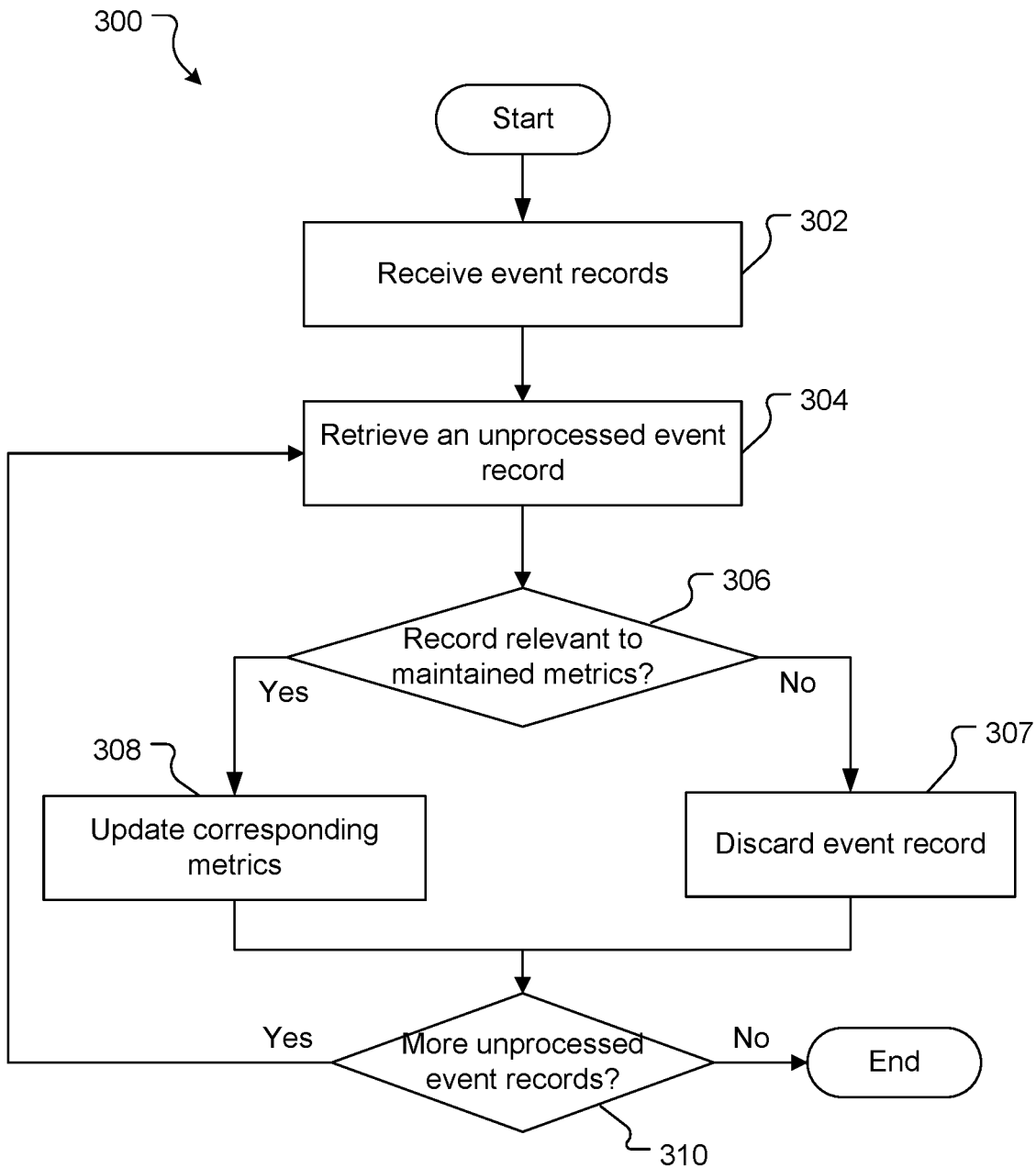
FIG. 3 is a flowchart depicting an example method for creating image usage metrics.
Figure 4:
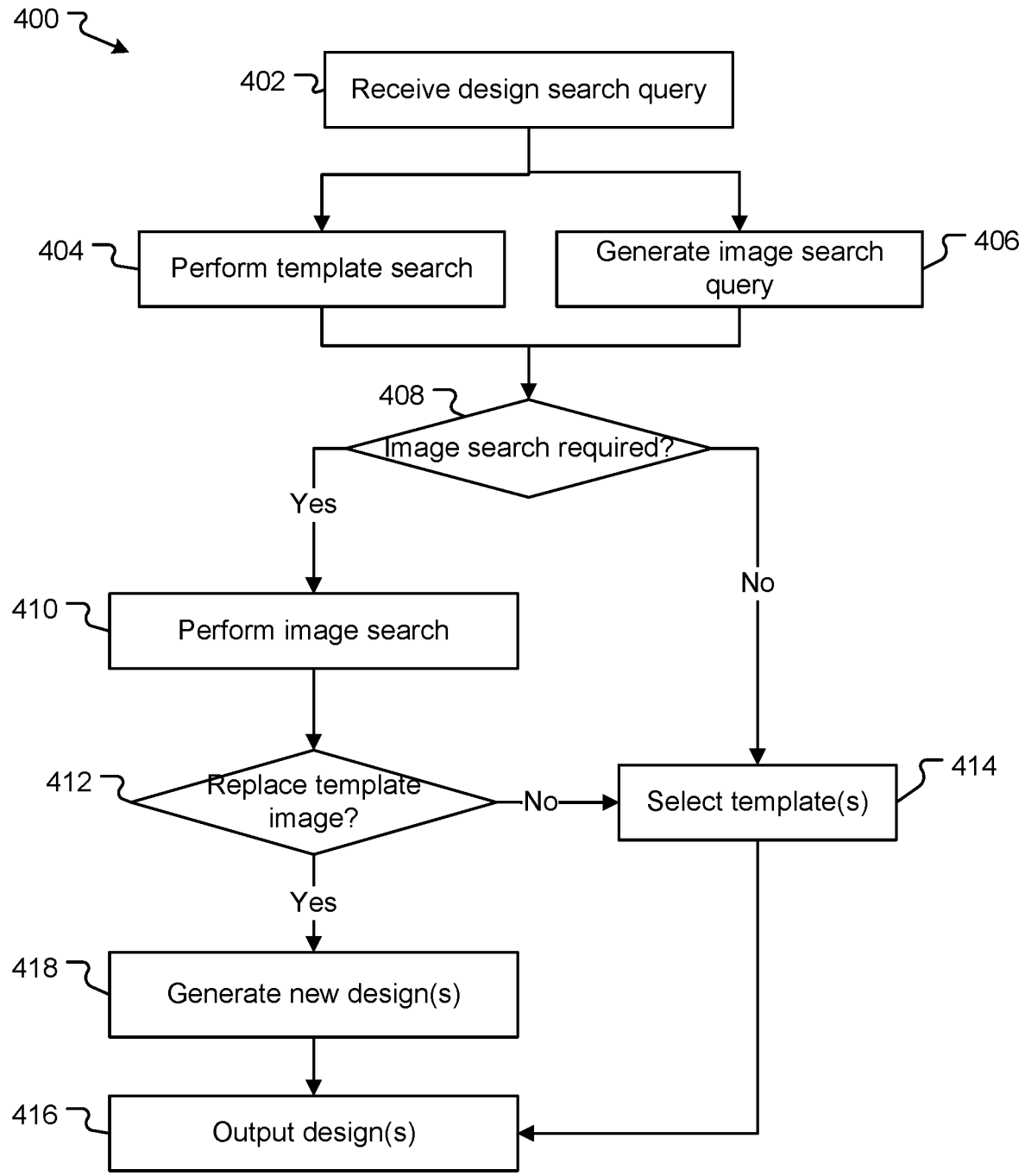
FIG. 4 is a flowchart depicting an example method for determining one or more design templates matching a design search query according to some aspects of the present disclosure.

{"Text input": "a birthday card for Jason's 13th birthday", "text output": ["birthday"]},
{"Text input": "video games and pizza night event poster", "text output": ["video games", "pizza"]},
{"Text input": "Instagram post for Ubuntu vs Debian", "text output": ["Ubuntu", "Debian"]},
{"Text input": "benefits of eating pineapple motivational Instagram post", "images": ["pineapple"]},
{"Text input": "Facebook post on the benefits of android vs iPhone", "text output": ["android", "iPhone"]},
{"Text input": "white and blue did you know interesting fact Instagram post", "text output": ["did you know"]},
{"Text input": "birthday card with an elephant wearing a funny hat", "text output": ["elephant with hat"]},
{"Text input": "save the date invitation for lunch, talk, gift, appreciate, fun", "text output": ["lunch", "talk", "gift", "appreciate", "fun"]},
{"Text input": "belly dance Q&A on Instagram story", "text output": ["belly dance"]},
{"Text input": "green coloured now hiring flyer for my landscaping business", "text output": ["landscaping"]},
{"Text input": "Instagram post advertising a social media webinar", "text output": ["webinar", "social media"]}, Various methods and processes for identifying design template(s) matching an input query will now be described. In particular, FIG. 3 illustrates an example process for creating image usage metrics, whereas FIG. 4 illustrates an example processes for matching design templates to input queries.

Although method 300 is described with reference to a single calculation process for a single metric, it will be appreciated that in practice this method is repeated periodically to calculate the various usage metrics (e.g., metrics shown in table E) maintained by the metrics module 121 in a given period.

The periodicity of method 300 depends on the manner in which the metrics module 121 is configured. In some cases, the metrics module 121 may be configured to update usage metrics hourly and in other cases, the metrics module 121 may be configured to update the usage metrics daily. The selected recomputing frequency may depend on a number of factors such as computation power required for the computing, the available computation power of the metrics module 121, etc.

Users (on their client systems 130) interact with the design templates maintained by the digital design platform 100. When a user account interacts with a design template, an event is generated. As referred to herein, an event is an interaction between a user account and content hosted by the server environment 110. Examples of events include, without limitation: viewing an image, selecting an image, adding an image to a design template, saving a design with the image as a new design, liking, or sharing an image, etc. This list of events is non-exhaustive and any other type of interactions with server hosted content (e.g., with design templates) can also be considered within the scope of the term "event."

When an event is detected, the design application 114 may generate information in respect of the event (in the form of an event record) and store this event record in the data storage 129. The event record may include a content type of the content a user interacted with. Content types may include design templates, videos, images, customized designs, etc. The event record may further include an identifier of the content the user interacted with, e.g., a design template ID, a design page ID, or an image ID of the content the user interacted with. In addition, the event record may include a timestamp indicating the date/time the event occurred, and an event type indicator that indicates the type of activity the user was performing when the event occurred. Examples include, e.g., viewing content such as a design template, an image, or a page; selecting content, editing content, liking content, etc.

The method begins at step 302, where event records corresponding to a particular time window W (e.g., last hour, last 6 hours, last day, etc.) are received at the matching application 118 and particularly at the metrics module 121. In certain embodiments, based on a current time T, the metrics module 121 retrieves events that occurred between the period T-W.

In certain embodiments, the event recording application 120) pushes event records to the metrics module 121 either in real time (i.e., whenever an event occurs) or at predetermined intervals (e.g., 15 minute intervals, hourly, etc.). In case event records are pushed at predetermined intervals, the metrics module 121 receives a batch of event records for events that were generated during that interval and stores these event records until it is time to compute the metrics.

In other embodiments, the metrics module 121 may pull event records from the event recording application 120 in real time (e.g., by utilizing webhooks that notify the metrics module 121 when events occur or are available at the event recording application 120) or by requesting the event platform at predetermined intervals (e.g., 1 minute intervals, 5 minute intervals, etc.) to provide event records that were generated in that interval. The metrics module 121 stores these event records until it is time to compute the metrics.

In some embodiments, the metrics module 121 may request the event recording application to provide event records related to images. The event recording application 120 may do so, in one example, by performing a search for image, graphic and/or photo in the content type field of the event records.

In any case, for the received event records, the metrics module 121 receives relevant data in respect of the event, which may, depending on the implementation, include metadata and/or content. In one example, the event record may include the data fields described previously.

At step 304, an unprocessed event record from the set of event records for that time window is selected.

At step 306, the metrics module 121 determines whether the event record is relevant to the maintained usage metrics. For example, if the metrics module 121 maintains image usage metrics (shown in table E), an event record corresponding to selection of a design template or any other type of media item such as a video or audio may not be a relevant event record. On the other hand, an event record corresponding to selection or saving of an image may be a relevant event record. In one instance, the metrics module 121 may determine whether an event record is relevant based on the usage metrics maintained by the metrics module 121 and the event type field of the event record.

At step 306, if the metrics module 121 determines that an event record is not relevant, the event record may be discarded, and the method proceeds to step 310. Alternatively, if the metrics module 121 determines that the event record is relevant, the method proceeds to step 308 where the metrics module 121 updates one or more usage metrics based on the event record. For instance, if the event record corresponds to publication of an image in a design, the metrics module 121 may update the design template usage metrics (table E) described above.

When updating a usage metric, if the metrics module 121 determines that a record already exists in the usage metric table or data structure, it updates the count of the corresponding usage record. For instance, when updating the image usage metrics (e.g., table E), if the metric module 121 determines that a record exists for the image ID of the event record in the usage metrics, it updates a corresponding publication, click or impression count for that existing record by one (depending on the event type). Alternatively, if the metrics module 121 determines that a record does not already exist in the corresponding usage metric or data structure, it adds a new record to the table or database with a count of 1.

At step 310, the metrics module 121 determines whether any unprocessed event records exist in the event records retrieved at step 302. If it is determined that one or more unprocessed event records exist, the method returns to step 304. Alternatively, if a determination is made that no unprocessed event records remain, the method 300 ends.

Accordingly, using method 300, the metrics module 121 creates and maintains one or more databases of usage metrics data. These databases are updated periodically based on the selected re-computation frequency. Furthermore, information stored in these databases may be subsequently analyzed to select matching design templates. These functions will be described in detail in the following sections.

Turning to FIG. 4, a computer-implemented method 400 for determining one or more candidate design templates that match a design search query is described. The method 400 commences at step 402 where the matching application 118 receives a design request. The design request may be generated by a client application 132 in response to a trigger action. For example, a user may be viewing a home page of the design application 114 on the user's client system 130 and may input a design search query in a search bar provided on the home page. The search query may be a natural language query such as: "Design a card for my 13 year old son's birthday" or "Design me a poster for my lost parrot." In other examples, the search query may be a string of keywords, such as: "13$^{th}$ birthday card" or "lost parrot poster." In response to the user entering the search query, the client application 132 may generate the design request that includes the design search query.

Figure 5:
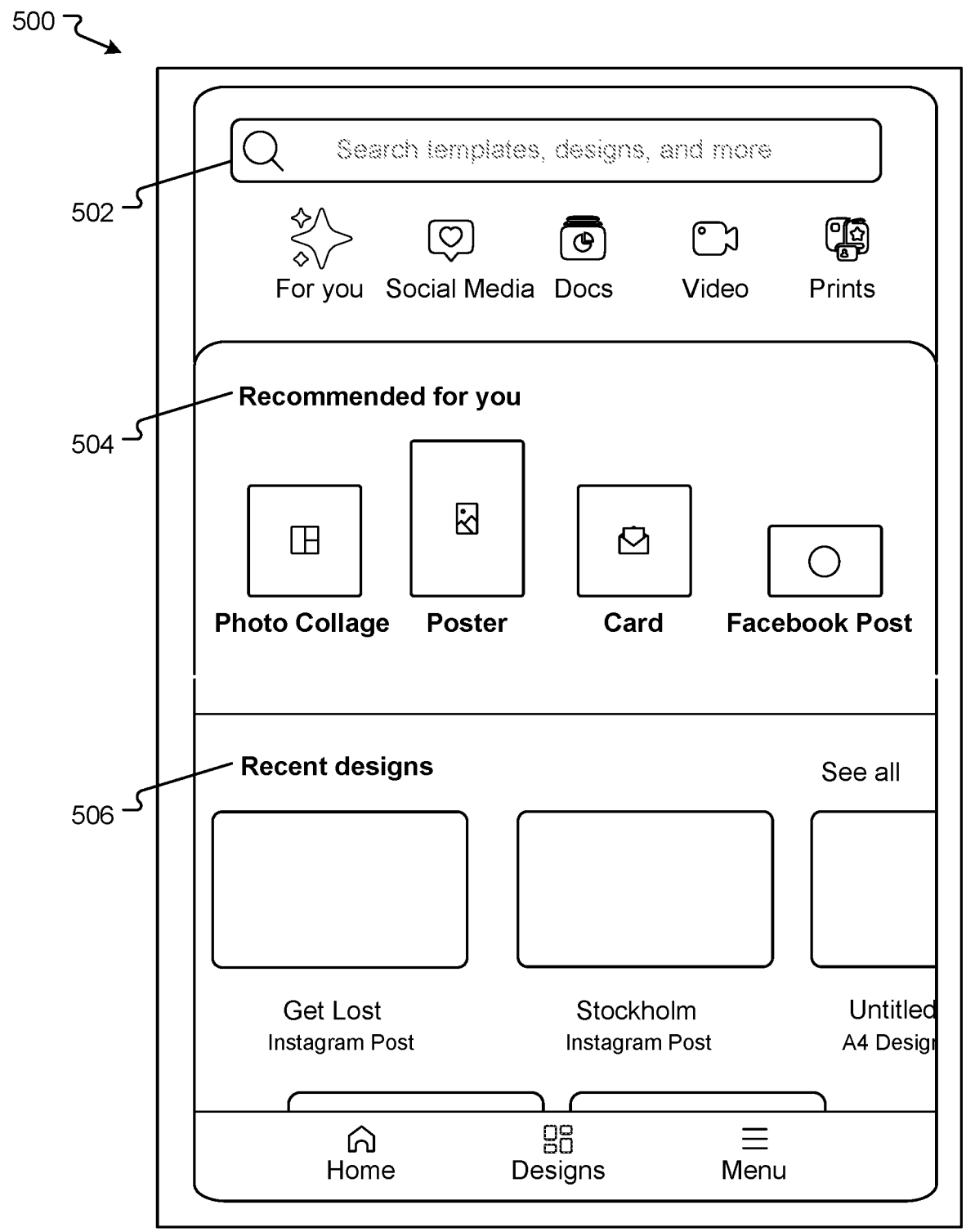
FIG. 5 depicts an example graphical user interface for triggering the method of FIG. 5.

FIG. 5 illustrates an example home page user interface 500 that may be utilized to receive the design search query. The user interface 500 includes a search bar 502, a recommendation section 504, and a recent designs section 506. The recommendations section 504 may display one or more design categories that may be recommended to the user (e.g., based on usage data). The recent designs section may display the recent designs created by the user and/or the recent design templates viewed or saved by the user. The user may enter a search string, such as "dinosaur party birthday invitation" in the search bar 502 and select an interactive control (such as "go" "search" or something similar), or press a key, such as an "enter" or "return" key on a physical or touchscreen keyboard.

In response to receiving the design search query, the client application 132 generates a design request that includes the design search query and communicates it to the server environment 110. In addition to the search query, the client application 132 may include information about the user making the request (in case the user has an account with the digital design application 114) in the design request before communicating it to the server environment 110.

Figure 6:
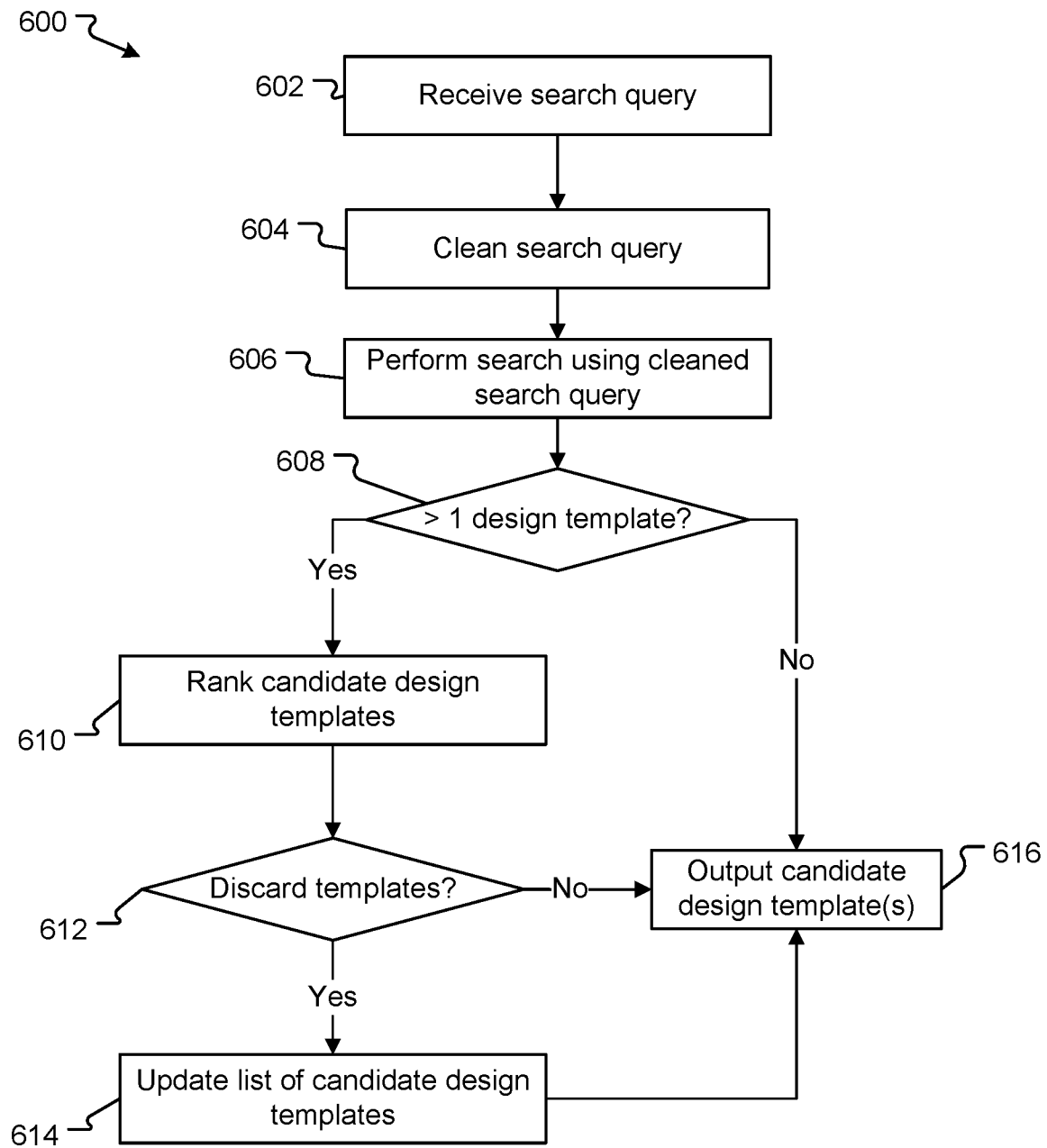
FIG. 6 is a flowchart illustrating an example method for performing a design template search according to some aspects of the present disclosure.

Next at step 404, the design application 114 and in particular, the matching application 118 receives the design request performs a template search based on the request. FIG. 6 is a flowchart illustrating an example method for performing step 404.

At step 602, the matching application 118 retrieves the design search query from the design request and passes it to the template finder 122.

At step 604, the template finder 122 may process the design search query to normalize and/or clean it. This processing may include, e.g., correcting the spellings of any misspelt words, such as "birtday", "poshter", etc., and removing any elements from the search query that may not aid in the search. This can include punctuation marks, articles, pronouns, names, etc. For instance, the template finder 122 may remove the words A, FOR and JASON'S from the search query: "a birthday card for Jason's 13$^{th}$ birthday" during the processing step The template finder 122 may also stem certain words in the search query to produce morphological variants of a root or base word. By way of example, in the process of stemming, the template finder 122 may identify words such as "chocolates," "chocolatey," and "choco" that are morphological variants of chocolate and replace them with the root word "chocolate." Another example would be to substitute words such as "retrieval," "retrieved," and "retrieves" with the root word "retrieve." The template finder 122 may also analyze the textual data to group together different inflected forms of a word so they can be analyzed as a single item. This process is commonly known as lemmatization. By way of illustration, the process of lemmatization can replace the words "better" with "good." This process essentially transforms various words to an equivalent base form.

At step 606, the template finder 122 utilizes the processed or normalized search query to perform a search for matching design templates. This may include, e.g., performing a lookup for the words in the search query in one or more fields of a design template record (e.g., such as example record shown in table A). For instance, the template finder 122 may perform a lookup for words in a search query in the category, metadata and/or title fields of design template records maintained in the data storage 129.

The identifiers of any design templates that include at least one of the search words may be retrieved as candidate design template identifiers at step 606. In some examples, the template finder 122 may be configured to retrieve candidate design templates that include exact matches for the words in the search query. In other examples, the template finder 122 may be configured to retrieve candidate design template that also include non-exact matches for words in the search query. For example, if a search word is TERMINATOR, the candidate design template may be configured to not only retrieve candidate design templates that include the word TERMINATOR in the metadata but also candidate design templates that include the word TERMINAL is the metadata.

Next, at step 608, a determination is made whether more than one design template identifier was identified at step 606. If more than one design template identifier was retrieved, the method proceeds to step 610 where the template finder 122 ranks or orders the retrieved candidate design templates based on one or more conditions.

In some embodiments, the template finder 122 may assign relevance scores to the candidate design templates and rank them based on descending relevance scores. The relevance scores may be assigned based on one or more factors. For instance, the relevance scores may be assigned based on the number of search words found in the design template's name or metadata. Design templates that include all the search words may be given higher relevance scores than design templates that include a subset of the search words. Further, the relevance scores may be assigned based on the location of the search words. For example, design templates that include one or more search words in their titles may be assigned a higher relevance score than design templates that include the one or more search words in their metadata. Another factor for determining relevance scores may be whether an exact match was found for a search word or not. Design templates that include exact matches for search words may be assigned higher relevance scores than design templates that include non-exact matches for search words. It will be appreciated that these are three illustrations of factors that can be considered when ranking design templates, and on any other factors or combinations of factors can be considered without departing from the scope of the present disclosure.

Once the design template identifiers are ranked, the template finder 122 may determine if any candidate design templates need to be discarded at step 612. Candidate design templates may be discarded for a variety of reasons. One reason may be to limit the number of candidate design templates to a predetermined limit (e.g., 20 results) set by a user or the matching application 118. If a predetermined limit condition is used, the template finder 122 compares the number of candidate design templates identified at step 606 with the predetermined limit. If the number of candidate design templates identified at step 606 exceeds the predetermined limit, the lowest ranked design templates that exceed the predetermined limit may be discarded and the method proceeds to step 614 where the list of candidate design templates is updated. Alternatively, if the number of candidate design templates identified at step 606 does not exceed the predetermined limit, no candidate design templates may be discarded at step 612 and the method proceeds to 616, where the candidate design templates are provided by the template finder to the decision module 127.

Another reason for discarding one or more candidate design templates may be based on a minimum or threshold relevance score (e.g., 50%). If a minimum or threshold relevance score condition is used, any candidate design templates that have a relevance score below the minimum relevance score may be discarded at step 612 and the list of candidate design templates may be updated at step 614.

Other reasons for discarding one or more candidate design templates may be one or more filters applied by the user or the design application 114. For example, the design application 114 or user may want to be shown design templates that include at least one image. In such cases, candidate design templates that do not include an image may be discarded at step 612. Other filter conditions such as specific aspect ratios for images, specific types of design templates (e.g., single page templates), may be specified and the template finder 122 may discard candidate design templates that do not match any of the filter conditions at step 612 and update the list of candidate design templates at step 614.

Method step 404 (and method 600) ends at step 616 where the final list of candidate design templates is communicated to the decision module 127.

Returning to method 400, at step 406, an image search query is generated. In particular, the matching application 118 provides the design search query to the query generator 123 and the query generator 123 outputs an image search query based on the design search query. Generally speaking, the image search query include keywords that indicate "visual" things—i.e., things that can be depicted visually (e.g., sunsets, vases, people, etc.). In some examples, the raw design search query may be provided to the query generator 123. In others, the processed/normalized design search query (after step 604) may be provided to the query generator 123.

In some embodiments, the query generator 123 may be a machine learning (ML) model that is configured to analyze the design search query and convert it into a query for searching images. To this end, the ML model may be trained to identify words in the design search query that may be associated with images or graphics and ignore or discard words that cannot or are not usually depicted visually (e.g., articles, pronouns, sounds, numbers, etc.). For example, consider the design search query: A BIRTHDAY CARD FOR JASON'S 13TH BIRTHDAY. In this case, the query generator 123 is configured to discard or ignore articles and numbers such as A, FOR, and $13^{TH}$. It is also configured to ignore overly specific words, such as names (e.g., JASON), but not ignore other overly specific words, such as cities (e.g., NEW YORK) or places of interest (e.g., EIFEL TOWER). Further, the model may be configured to ignore any design template category words (e.g., FLYER, POSTER, POST, etc.) and identify multi-token concepts such as "BELLY DANCE," "INSTAGRAM POST" or "VIDEO GAMES."

In one example, a specific ML model may be utilized that is specifically trained to perform the task of converting design search queries into image search queries. In this case, an ML model may be fed copious amounts of training data initially to train it—e.g., it may be provided a large number of design search queries and their corresponding expected image search queries (e.g., hundreds of thousands of input/output labelled queries). The ML model may be trained on this data until it can accurately determine an image search query for a given design search query most of the time. Then, at execution time, a user input design search query or a normalized design search query may be provided to the trained ML model and it outputs an image search query.

In other cases, a pre-trained generalized language ML model (that can perform any language-based task) may be utilized. An example of such a generalized language ML model is ChatGPT. The ML model in ChatGPT is trained on vast amounts of text data, such as books, articles, and other written works. This data is used to teach the model how to recognize patterns and relationships between words and phrases, and how to generate new text that sounds natural. Once the model has been trained on this data, it can be used to generate new text in response to any user input. As a generalized ML model of this type may not know the specific task of converting design search queries into image search queries, a small amount of training data (e.g., 10-20 samples of design search queries and corresponding image search queries) may be provided to the ML model to teach it to output expected image search queries for given design search queries.

It will be appreciated that although the query generator 123 is described as a ML model, this need not be the case. In other embodiments, the query generator 123 may be based on traditional natural language processing heuristics or statistics from search query logs, or pre-trained word embeddings. In such cases, the query generator 123 receives an input search query and outputs an appropriate image-seeking query.

In the case of the pre-trained generalized ML model, in some embodiments, the training data stored in table F may be provided to the model when method 400 is executed—i.e., with each new query. In other embodiments, the training data stored in table F may be provided once per session with the ML model. The training data is not required with each new query in this embodiment as long as an active session is maintained with the ML model. Once the session ends, the training data (e.g., in table F) may be provided to the machine learning model again when a new session is initiated.

In any event, the query generator 123 outputs an image search query that includes one or more "visual" keywords that can be used to perform searches for images that may match the design search query. For instance, if the design search query is for a pizza and video games night poster, the image search query words may be pizza and video games. Similarly, if the design search query is for a birthday card with an elephant wearing a funny hat, the image search query may be "elephant with hat." It will be appreciated that in this example, 'elephant with hat' is considered one keyword and not three keywords as images of elephants with hats are required and not separate images of elephants or hats.

Once the image search query keywords are generated, the method proceeds to step 408 where a decision is made whether an image search is required. This is an optional step or check. In some implementations, an image search may always be performed and in such cases, step 408 is not required. In other implementations, an image search may be performed in certain cases (e.g., when the template search does not yield accurate results) and may not be performed in other cases. In such implementations, method step 408 is included.

At step 408, the decision module 127 decides whether an image search is required. This check is performed to determine whether the design templates identified at step 404 match or 'fully explain the query'. In some embodiments, this decision may be made based on the identified candidate design templates and the image search query using a heuristic approach. For instance, the decision module 127 may determine that an image search is not required if the results of the template search are accurate enough. To aid with this, the decision module 127 may determine whether the image search query keywords are present in one or more candidate design templates. In particular, it may perform a search using the image search query keywords in the metadata fields (e.g., title, description, keyword fields) of the records of the identified candidate design templates. If matches are found for all the image search query keywords in a threshold percentage or number of the candidate design templates (e.g., 60% or 14 templates), the decision module 127 may determine that an image search is not required.

Alternatively, if matches are not found for all the image search query keywords in the metadata associated with the candidate design templates or matches are found in less than the threshold percentage or number of the candidate design templates, the decision module 127 may determine that an image search is required.

In another example, the decision module 127 may assess the image search query keywords and determine whether these words are appropriate—e.g., are any of the words inappropriate words (e.g., slang, profane, sexual, religious, etc.). If all the keywords in the image search query are identified as inappropriate words, the decision module 127 may determine that an image search is not required. Alternatively, if at least one of the image search query keywords is identified as an appropriate word, the decision module 127 may determine that an image search can be performed.

It will be appreciated that these are two approaches that may be employed by the decision module 127 to determine whether an image search is required. Other approaches and conditions for determining whether an image search is required may be utilized without departing from the scope of the present disclosure. For example, the decision module 127 may determine whether the keywords or descriptions of the images associated with the identified design templates are similar to the image search query keywords. If they are determined to be similar (e.g., having a threshold similarity score), the decision module 127 may determine that an image search is not required. Otherwise, it may determine that an image search is required.

Figure 7:
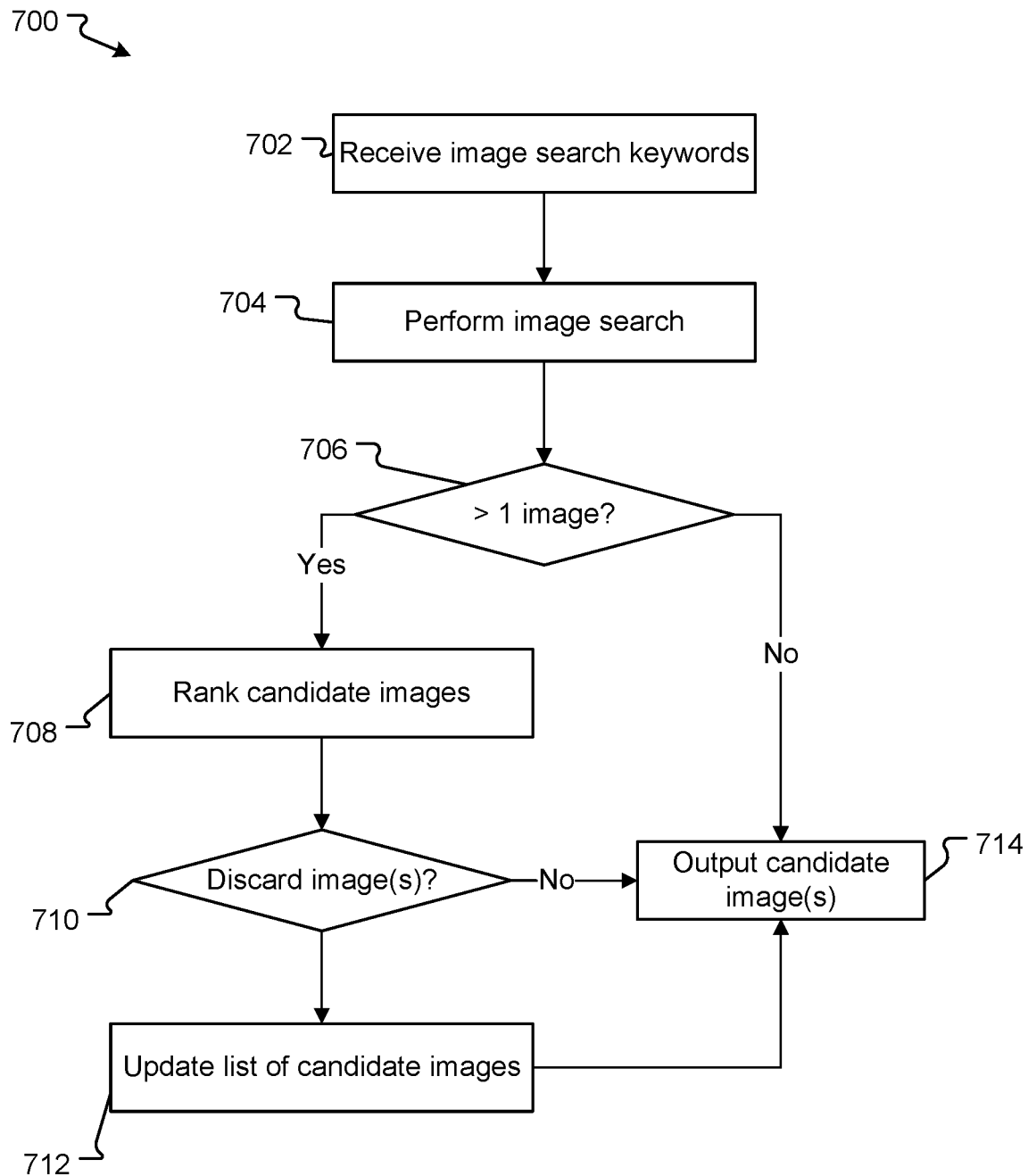
FIG. 7 is a flowchart illustrating an example method for performing an image search according to some aspects of the present disclosure.

If a decision is made at step 408 that an image search is required, the method proceeds to step 410 where the image search is performed. FIG. 7 is a flowchart illustrating an example method for performing the image search. The method commences at step 702 where the decision module 127 provides one or more keywords from the image search query to the image search engine 124. In some cases, all the keywords from the image search query are provided to the image search engine 124 (e.g., because none of the keywords were found in the metadata associated with a threshold number of the candidate design templates, or all the keywords were appropriate). In other cases, a subset of the keywords from the image search query are provided to the image search engine 124 and the remaining keywords are discarded (e.g., because the discarded keywords were found in the metadata associated with at least a threshold number of the candidate design templates, and/or the discarded keywords were inappropriate).

At step 704, the image search engine 124 performs a lookup using the keywords provided by the decision module 127 in an image repository. The image repository may be maintained by the design application 114 and stored in data storage 129. In other examples, the image repository may be maintained by a third party application or by the user on their client system 130 (e.g., in a non-transitory memory 210). In whatever source of images the search it performed, it includes performing a lookup in certain fields of image records maintained in the image repository (e.g., in the image title field, in the description field, and/or metadata field). If matches are found for the keywords in any of the image records, the corresponding image records are identified as candidate image records.

Next, at step 706, a determination is made whether more than one candidate image was identified at step 704. If more than one candidate image was identified, the method proceeds to step 708 where the image search engine 124 ranks or orders the candidate images based on one or more conditions. The image search engine 124 may assign confidence scores to the candidate images and use these confidence scores to rank the candidate images. The confidence scores may be based on a number of factors, such as location of keywords in image data, degree of match between a keyword and image data, popularity of the image (e.g., click and/or publish counts), etc. For example, images that include a keyword in their title may be assigned a higher confidence score than images that include a keyword in their keyword or description field. Similarly, exact matches of keywords may result in higher confidence scores than non-exact matches (e.g., if the keyword is TERMINATOR, and an identified image includes the word TERMINAL, it may be assigned a lower confidence score than an image that includes the word TERMINATOR). Further, images that have higher click and/or publish counts may be ranked higher than images that have lower click and/or publish count. It will be appreciated that these are a few example factors for determining confidence scores and these scores may be computed based on any other factors or combinations of factors without departing from the scope of the present disclosure. For example, multiple text matching factors and usage-based factors may be combined by a ML model to predict a confidence score for the identified images. It will be appreciated if more than one keyword was searched, the image search engine 124 may create separate ranked lists of candidate images for different keywords.

Once the image identifiers are identified and ranked, the image search engine 124 may determine if any candidate images need to be discarded at step 710. Candidate images may be discarded for a variety of reasons. One reason may be to limit the number of candidate images to a predetermined limit (e.g., 5 results/keyword). If a predetermined limit condition is used, the image search engine 124 compares the number of candidate images identified at step 704 with the predetermined limit. If the number of candidate images identified at step 704 for any given keyword exceeds the predetermined limit, the lowest ranked images that exceed the predetermined limit may be discarded and the method proceeds to step 712 where the list of candidate images for the keywords is updated. Alternatively, if the number of candidate images for each keyword does not exceed the predetermined limit, no candidate images may be discarded and the method proceeds to 714, where the candidate images are provided by the image search engine 124 to the decision module 127.

Another reason for discarding one or more candidate images may be based on a minimum relevance score (e.g., 50%). If a minimum relevance score condition is used, any candidate images that have a relevance score below the minimum relevance score may be discarded at step 712 and the list of candidate images may be updated at step 714.

Another reason for discarding one or more images may be based on a popularity score. To this end, the image search engine 124 may utilize the image usage metrics (e.g., in table E) maintained by the metrics module 121. In particular, the image search engine 124 may perform a lookup in the image usage metrics for the image identifiers of the candidate images. If any matches are found, it inspects the corresponding count of the number of times the identified candidate images have been published or saved by users. If a candidate image has not been published or saved a threshold number of times, it may be discarded at step 712 and the list of candidate images may be updated at step 714.

Other reasons for discarding one or more candidate images may be one or more filters applied by the user or the design application 114. For example, the design application 114 or user may want to be shown images that have a certain aspect ratio, image quality, opacity, etc. Alternatively, image size, aspect ratio, and/or opacity may be filtered based on the image sizes, aspect ratios, and/or opacity of the images present in the candidate design templates. In such cases, the image search engine 124 may discard candidate images that do not match any of the filter conditions at step 712 and update the list of candidate design templates at step 714.

Method step 410 (and method 700) ends at step 714 where the final list of candidate images is communicated to the decision module 127.

At step 412, the decision module 127 determines whether target images in one or more candidate design templates should be replaced by one or more candidate images. This is an optional step or check. In some implementations, target images in the candidate design templates are always replaced by one or more candidate images and in such cases, step 412 is not required. In other implementations, target images in candidate design templates may be replaced in certain cases (e.g., when the candidate images are more suitable than the target images) and may not be performed in other cases. In such implementations, method step 412 is included.

When applicable, for each candidate design template, the decision module 127 determines whether the target image of the candidate design template needs to be replaced by a candidate image based on the candidate design template and the one or more candidate images. This decision may utilize a heuristic approach. In one example approach, the decision module 127 may determine to replace the target image if the candidate design template has a relevance score below a certain threshold score (e.g., 80%). In another example approach, the decision module 127 may determine to replace the target image if the candidate design template does not include a keyword of the image search query. For example, if the image search query word is PARROT, the decision module 127 decides to replace the target image of candidate design templates that do not include the word PARROT in the template metadata. In yet another example, it may determine to replace the target image of a candidate design template if the confidence score of a candidate image is higher than a threshold confidence score (e.g., 80%) and/or the candidate image has been used in a design a threshold number of times. In still another example, the decision module 127 may decide to replace the target image of a threshold number of candidate design templates (e.g., 5). It will be appreciated that the decision module may use any one of these approaches or a combination of these approaches to determine whether a target image should be replaced by a candidate image or not. Further, the approaches described about are examples and other heuristic approaches in combination with these or instead of these approaches may be utilized without departing from the scope of the present disclosure.

At step 412, if the decision module 127 determines that the target image of a given candidate design template does not need to be replaced by a candidate image, decision module 127 adds the identifier of the candidate design template to a list of unchanged design templates. Alternatively, if it determines that the target image of a given candidate design template needs to be replaced by a candidate image, it adds the identifier of the candidate design template to a list of design templates that need to be updated. The decision module 127 makes this decision for each of the candidate design templates. Once completed, if any design templates exist in the list of unchanged design templates, the method proceeds to step 414 where the decision module 127 communicates the list of unchanged candidate design templates to the output module 128 at step 416. This involves retrieving the design records, page records (if applicable), and element records from the data storage 129 for the candidate design templates in the list and communicating the records to the output module 128.

Returning to step 412, if any design templates exist in the list of design templates to be updated, the method proceeds to step 418, where the decision module 127 communicates the list to the design module 126 along with the candidate images.

For each design template in the list of design templates to be updated, the design module 126 replaces the target image of the design template with a received candidate image. This may be done in various ways and may depend on the type of digital design application 114. In some cases, the identifiers of the candidate design templates in the list may be communicated to the design module 126 along with an identifier or location of the candidate image(s). In case one or more of the candidate image(s) are managed by the digital design application 114, the media identifiers of the candidate images is provided to the design module 126. Alternatively, if one or more of the candidate images are available at a different source (e.g., third party application or client system 130), the matching application 118 may assign temporary media identifiers to the candidate images and store image records of the candidate images with the other image records or store the media images in a temporary cache. In case a temporary media identifier and record is created for external candidate images, the temporary identifiers are provided to the design module 126 at step 418. Otherwise, information about the location of the input image in the cache may be provided at this step.

The design module 126 utilizes the identifier or location information of the candidate images and replaces the media item identifiers of the target image in the candidate design templates' element records (see table C) with the identifier or location information of a corresponding candidate image. It may then save the new design templates (with new design template records) as new temporary design records (e.g., in a temporary cache).

When updating the element records, the design module 126 may manipulate the candidate image in some embodiments. For instance, if a candidate image's size is smaller than the size of the design element of a particular target image, the design module 126 may increase the size of the candidate image to match the size of the design element. Similarly, if the image size of a candidate image is larger than the size of the design element of a particular target image, the design module 126 may reduce the size of the candidate image (e.g., by cropping or shrinking) to match the size of the design element with which the target image was associated. In another example, if the candidate image has a different aspect ratio to the aspect ratio of the target image, the design module 126 may stretch or crop the candidate image such that its aspect ratio matches that of the target image before replacing the target image identifier with the candidate image identifier in the corresponding candidate design template.

Generally speaking, the design module 126 attempts to create a diverse set of image injected design templates. When a single design template and a single candidate image is provided to the design module 126 it replaces the target image of the design template with the candidate image. When multiple design templates are provided and a single candidate image is provided, the design module 126 replaces the target image of each of the design templates with the candidate image. Alternatively, when a single design template is provided and multiple candidate images are provided, the design module 126 may generate multiple new design templates—with different candidate images. Finally, when n design templates and m candidate images are provided to the design module 126 (where n and m are greater than 1), the design module 126 may swap target images in the n design templates with a randomly selected candidate image from the m candidate images. In other examples, instead of being random, the design module 126 may swap target images in the design templates with candidate images that most closely match the target images structurally (e.g., in aspect ratio, size, opacity, etc.). For example, a target image having a particular set of structural attributes (such as aspect ratio, size, and/or opacity) may be replaced by a candidate image having similar structural attributes. In still other examples, some order may be utilized, e.g., based on ranking. That is, the target images of the highest ranked design templates may be replaced by candidate images having the highest confidence scores and the target images of lower ranked design templates may be replaced by candidate images having lower confidence scores. Alternatively, target images of the lowest ranked design templates may be replaced by candidate images having the highest confidence scores and the target images of higher ranked design templates may be replaced by candidate images having lower confidence scores.

Once new design templates are created based on the design templates in the list of design templates to be updated, the design module 126 communicates the records for the new design templates to the output module 128. At step 416, the output module 128 communicates a set of candidate design template(s) to the client application 132 that generated the initial template-matching request. It will be appreciated that the set of candidate design templates may include unchanged candidate design templates (e.g., the ones the decision module 127 decided did not need to be updated) and/or new candidate design templates (e.g., the ones the decision module 127 decided needed to be updated). In some embodiments, the output module 128 arranges the set of original and/or new candidate design template(s) in some order before communicating to the client system. For example, the matching application 118 may arrange the candidate design templates based on relevance scores (which remain unchanged for the unchanged candidate design templates and are updated for the new candidate design templates based on the original relevance scores of the candidate design templates and the confidence scores of the candidate images used in the new candidate design templates).

In some cases, the output module 128 may communicate the entire set of candidate design template(s) to the client application 132. Alternatively, the output module 128 may save the set of candidate design template(s) in a cache and communicate a subset of the candidate design template(s) to the client application 132 along with a number of available candidate design templates.

In the first example, where the client application 132 receives all the candidate design template(s), the client application 132 may display previews of the candidate design templates in a user interface. In some cases, it may display a first x number of candidate design templates on the screen and provide a scrolling control to view additional candidate design templates that do not fit on the display screen. In others, it may display a subset of the candidate design templates on the screen with controls to switch between previews of different candidate design templates.

Figure 8:
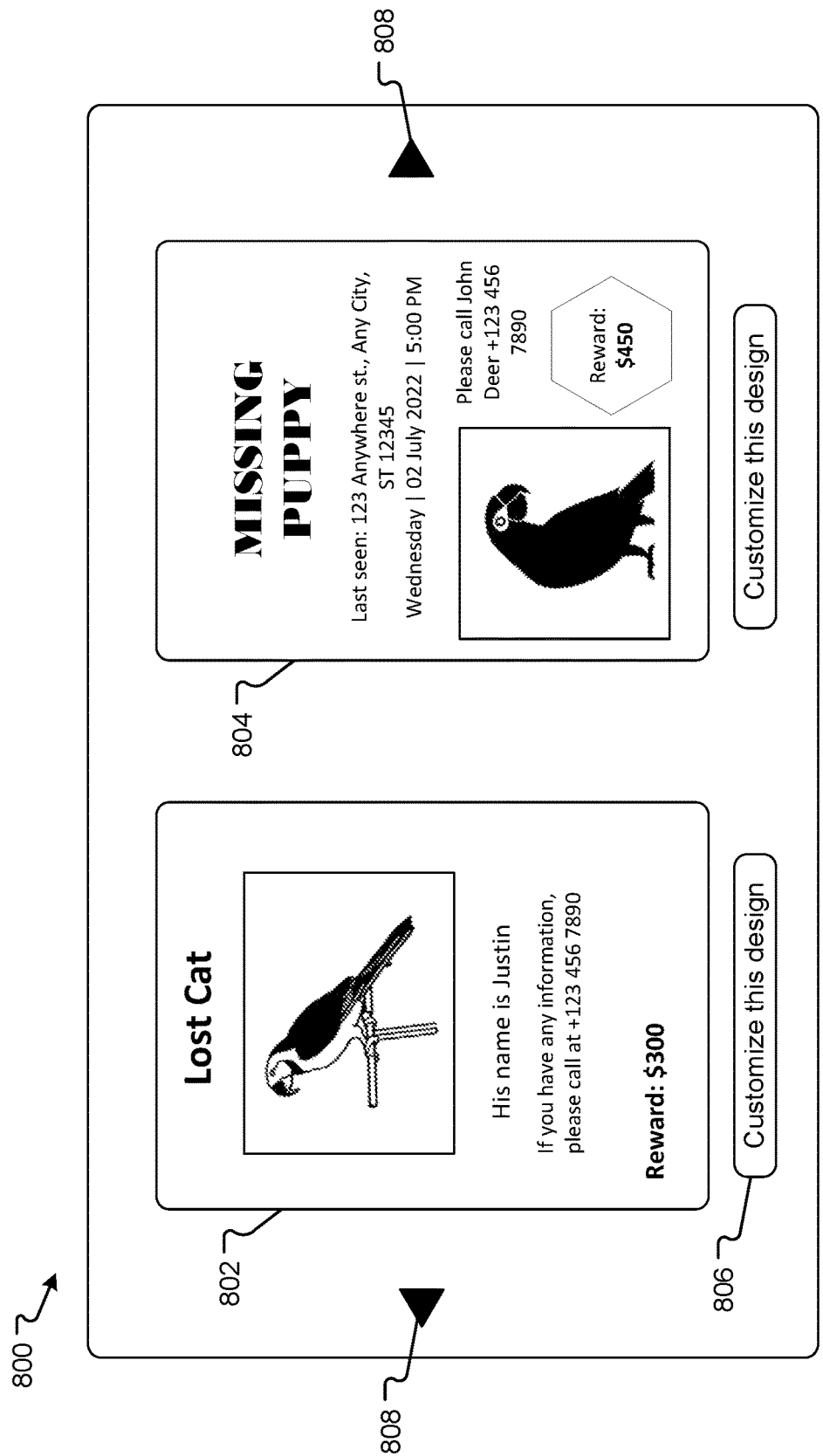
FIG. 8 depicts an example graphical user interface displaying design templates matching a design search query.

FIG. 8 illustrates an example UI 800 displayed at step 416. In this case, the UI 800 displays two different candidate designs—802 and 804. In the designs, a target image in an original candidate design template has been replaced by a candidate image. The UI 800 includes a control 806 for each design to customize the corresponding design. If the user selects this control, a new window or pop-up user interface may be displayed that allows the user to edit one or more design elements of the selected design template. The UI 800 also includes previous/next controls 808 that allow a user to view other candidate designs (if available).

In the second example, the client 132 may display a first candidate design template and may provide 'next'/'previous' controls to view any other available candidate design templates. In this case, the design module 126 may generate the first candidate design template initially and then generate other candidate design templates from the set of candidate design templates when requested by the client application 132.

If the user selects any of the new design templates displayed on the user interface and proceeds to customize the new design, the digital design application 114 may store the design record for the new design template in association with the user account. The new temporary design records for the new candidate design templates that were not selected by the user may be flushed from the cache.

It will be appreciated that although method steps 404 and 406 are described sequentially, these steps need not be implemented sequentially in actual practice. These steps may be independent (e.g., if step 406 does not require the clean template search query from step 404). In such cases, these steps can be performed simultaneously or substantially simultaneously.

Further, in the systems and methods described above, the design template creates and communicates the new design templates to the client device. In other examples, the design template may not create the new design templates and/or store the new design templates in a cache in the server. Instead, the design template may pass the records of the selected candidate design templates to the client application along with instructions to edit the design templates (e.g., by inserting an image having a certain image identifier into a certain position in the design template). The client application then creates the new design templates based on the template records, the edit instructions, and the identifier of the replacement images.

In the method 400 described above, one or more candidate design templates may be automatically updated by the design module 126 before the set of candidate design templates is communicated to the client device. In other embodiments, the matching application may communicate the unchanged candidate design template and the candidate images to the client system 130. In this embodiment, the client application 132 may display a user interface that includes unchanged design templates in one portion of the user interface (e.g., in a templates pane) and candidate images in another portion of the user interface (e.g., in an images pane). The user interface may allow the user is select any image from the set of candidate images and update any candidate design template based on the selected candidate image. For example, the user may select a candidate image and drag the candidate image over to a candidate design template and drop the dragged candidate image on the candidate design template. This may cause the client application 132 to communicate the design template identifier and the candidate image identifier to the design module 126. The design module may then generate a new design template that replaces a target image of the design template with the candidate image as described previously, and communicate the new design template to the client application 132. The client application 132 may then replace the original design template with the new design template.

It will be appreciated that in this embodiment, the design application may be executed on the client application 132 to reduce any latency in creating and displaying the updated design template.

Further, although in the embodiments described herein the user provides an input search query and the system automatically determines candidate design templates based on this input search query, this need not be the case in all implementations. In some cases, the user may provide further inputs to filter the candidate design templates. For example, the user may provide one or more design template parameters, such as design template categories, color theme, etc., that can be used by the matching application 118 to determine the final set of candidate design templates.

In some variations, instead of replacing a target image in a design with a candidate image, the systems and methods may be configured to replace other media items such as video files or audio files in a design template. In such embodiments, the systems and methods may be configured to generate audio or video search queries. When generating audio search queries a machine learning model may be utilized that is trained to receive an input design query and ignore words or tokens in the query that are not related to auditory things (e.g., sunset or vase) and select words or tokens that are related to auditory things (e.g., birds chirping, rain, gust of wind, etc.). Similarly, when generating video search queries, a machine learning model may be utilized that is trained to receive an input design query and ignore non-visual words or tokens (e.g., $13^{th}$ or vase) and select words or tokens in the query that are related to visual, action things (e.g., setting sun, blowing candles, running, walking, etc.)

Further, in such embodiments, the systems and methods may be configured to search for audio or video files using the audio or video search queries and replace one or more target audio or video files in a candidate design template with one or more candidate audio or video files. Further still, in such embodiments, the design application 114 may maintain an audio or video repository and be configured to identify candidate design templates that include at least one target audio or video target media item.

In the methods 300-500 described above, where client application 132 operates to display controls, interfaces, or other objects, client application 132 does so via one or more displays that are connected to (or integral with) system 200—e.g. display 218. Where client application 132 operates to receive or detect user input, such input is provided via one or more input devices that are connected to (or integral with) system 200—e.g. a touch screen, a touch screen display 218, a cursor control device 224, a keyboard 226, and/or an alternative input device.

Further, in the above embodiments certain operations are described as being performed by the client system 130 (e.g. under control of the client application 132) and other operations are described as being performed at the server environment 110. Variations are, however, possible. For example in certain cases an operation described as being performed by client system 130 may be performed at the server environment 110 and, similarly, an operation described as being performed at the server environment 110 may be performed by the client system 130. Generally speaking, however, where user input is required such user input is initially received at client system 130 (by an input device thereof). Data representing that user input may be processed by one or more applications running on client system 130 or may be communicated to server environment 110 for one or more applications running on the computer processing hardware 112 to process. Similarly, data or information that is to be output by a client system 130 (e.g. via display, speaker, or other output device) may ultimately involve that system 130. The data/information that is output may, however, be generated (or based on data generated) by client application 132 and/or the server environment 110 (and communicated to the client system 130 to be output).

In the embodiments described above and the figures, various examples of how different types of GUI elements (and/or different GUI areas/regions) may be visually distinguished are provided. Alternative means for visually distinguishing GUI elements are possible. By way of example, techniques for visually distinguishing GUI elements may include one or a combination of: shading colors; shading patterns; line colors; line weights; line styles; transparencies; icons; character annotations; and/or other visual techniques.

In the present disclosure, processing is performed with respect to individual design pages. To this end, and unless stated otherwise, reference to a design herein is reference to a single page of a design. The techniques described herein may, however, be adapted to be applied to multi-page designs, for example by processing each page of a multi-page design separately.

Further, the present disclosure concerns replacing one or more graphic design elements in designs. As noted above, in some implementations a design may be able to have multiple pages. Where multi-page designs are possible, reference in the present disclosure to replacing an element in a design is (unless stated otherwise) to be understood as replacing an element in a particular page of a design. The particular page is, e.g., a page selected by a user (for instance, a page that has been selected and is displayed in a preview area of a UI displayed on a display 218 of the client system 130).

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by (or in conjunction with) different applications running on the same or different computer processing systems.

The present disclosure provides various user interface examples. It will be appreciated that alternative user interfaces are possible. Such alternative user interfaces may provide the same or similar user interface features to those described and/or illustrated in different ways, provide additional user interface features to those described and/or illustrated, or omit certain user interface features that have been described and/or illustrated.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used to distinguish elements from one another and not in an ordinal sense. For example, a first candidate design template could be termed a second candidate design template or vice versa without departing from the scope of the described examples. Furthermore, when used to differentiate elements or features, a second candidate design template could exist without a first candidate design template. For example, a second user input could occur before a first user input (or without a first user input ever occurring).

It will be understood that the embodiments disclosed and defined in this specification extend to alternative combinations of two or more of the individual features mentioned in or evident from the text or drawings. These different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

The invention claimed is:

1. A computer-implemented method including:
receiving a design search query;
performing a template search based on the design search query, the template search returning a first design template, the first design template including a target image;
processing the design search query to generate an image search query, wherein the image search query includes one or more visual tokens based on the design search query and excludes non-visual tokens in the design search query, wherein generating the image search query includes providing the design search query to a machine learning model that is trained to ignore the non-visual tokens in the design search query and output the image search query including the one or more visual tokens;
performing an image search based on the image search query, the image search returning a candidate image;
generating a new design, wherein:
the new design is based on the first design template; and
the new design includes the candidate image instead of the target image.

2. The computer-implemented method of claim 1, wherein prior to performing the image search, the method includes:
determining that the image search is not required based on the image search query and the first design template; and
in response to determining that the image search is not required:
foregoing generating the new design; and
returning the first design template.

3. The computer-implemented method of claim 2, wherein determining that the image search is not required includes:
determining that one or more terms of the image search query appear in metadata associated with the first design template.

4. The computer-implemented method of claim 2, wherein determining that the image search is not required includes:
determining that a relevance score of the first design template exceeds a threshold relevance score.

5. The computer-implemented method of claim 1, wherein prior to generating the new design, the method includes:
determining that generation of a new design is not required based on the candidate image and the first design template; and
in response to determining that generation of the new design is not required:
foregoing generating the new design; and
returning the first design template.

6. The computer-implemented method of claim 5, wherein determining that generation of a new design is not required includes:
determining that a confidence score of the candidate image is below a threshold confidence score.

7. The computer-implemented method of claim 5, wherein determining that generation of a new design is not required includes:
determining that the candidate image has been used in a design less than a threshold number of times.

8. The computer-implemented method of claim 5, wherein determining that generation of a new design is not required includes:
determining that one or more structural attributes of the target image do not match corresponding one or more structural attributes of the candidate image.

9. A computer-implemented method for identifying one or more design templates matching a design search query, including:
receiving the design search query, the design search query provided by a user;
performing a template search based on the design search query, the template search returning a set of design templates, each of the set of design templates including a target image;
processing the design search query to generate an image search query, wherein the image search query includes one or more visual tokens based on the design search query and excludes non-visual tokens in the design search query, wherein generating the image search query includes providing the design search query to a machine learning model that is trained to ignore the non-visual tokens in the design search query and output the image search query including the one or more visual tokens;
performing an image search based on the image search query, the image search returning a set of candidate images;
generating a set of design templates, the set of design templates including one or more new design templates, the one or more new design templates being based on one or more design templates from the set of design templates and including one or more candidate images from the set of candidate images instead of their corresponding target images.

10. The computer-implemented method of claim 9, wherein prior to performing the image search, the method includes:
   determining that the image search is not required based on determining that metadata of a threshold number of the design templates in the set of design templates includes one or more keywords of the image search query.

11. The computer-implemented method of claim 9, wherein prior to performing the image search, the method includes:
   determining that the image search is not required based on determining that a relevance score of a threshold number of the design templates in the set of design templates exceeds a threshold relevance score.

12. The computer-implemented method of claim 9, wherein prior to generating the one or more new design templates, the method includes:
   for each design template in the set of design templates, determining whether generation of one or more new design templates is required based on the set of candidate images and the design template; and
   in response to determining that generation of the new design is not required:
      foregoing generating the new design; and
      returning the design template.

13. The computer-implemented method of claim 9, further including:
   determining a confidence score for each of the candidate images in the set of candidate images; and
   ranking the candidate images in the set of candidate images based on the determined confidence scores.

14. The computer-implemented method of claim 9, wherein generating the set of design templates includes:
   identifying at least a subset of design templates from the set of design templates as candidates for new design templates;
   for each candidate design template in the subset of design templates:
      selecting a candidate image from the set of candidate images; and
      replacing a target image with the selected candidate image.

15. The computer-implemented method of claim 14, wherein identifying the subset of design templates includes at least one of:
   determining that one or more terms of the image search query do not appear in metadata associated with the subset of design templates; or
   determining that relevance scores of the subset of design templates is below a threshold score.

16. The computer-implemented method of claim 15, wherein selecting the candidate image from the set of candidate images is based on matching one or more structural attributes of the target image with a candidate image in the set of candidate images.

17. A non-transitory machine readable medium storing instructions executable by a processing unit to cause the processing unit to:
   receive a design search query;
   perform a template search based on the design search query, the template search returning a first design template, the first design template including a target image;
   process the design search query to generate an image search query, wherein the image search query includes one or more visual tokens based on the design search query and excludes non-visual tokens in the design search query, wherein generating the image search query includes providing the design search query to a machine learning model that is trained to ignore the non-visual tokens in the design search query and output the image search query including the one or more visual tokens;
   perform an image search based on the image search query, the image search returning a candidate image;
   generate a new design, wherein:
      the new design is based on the first design template; and
      the new design includes the candidate image instead of the target image.

18. The non-transitory machine readable medium of claim 17, further storing instructions executable by the processing unit to cause the processing unit to:
   prior to performing the image search:
      determine that the image search is not required based on the image search query and the first design template; and
      in response to determining that the image search is not required:
         forego generating the new design; and
         return the first design template.

* * * * *